G. W. CURTISS.
CAMERA.
APPLICATION FILED MAY 24, 1909.
1,044,028.
Patented Nov. 12, 1912.
3 SHEETS—SHEET 1.
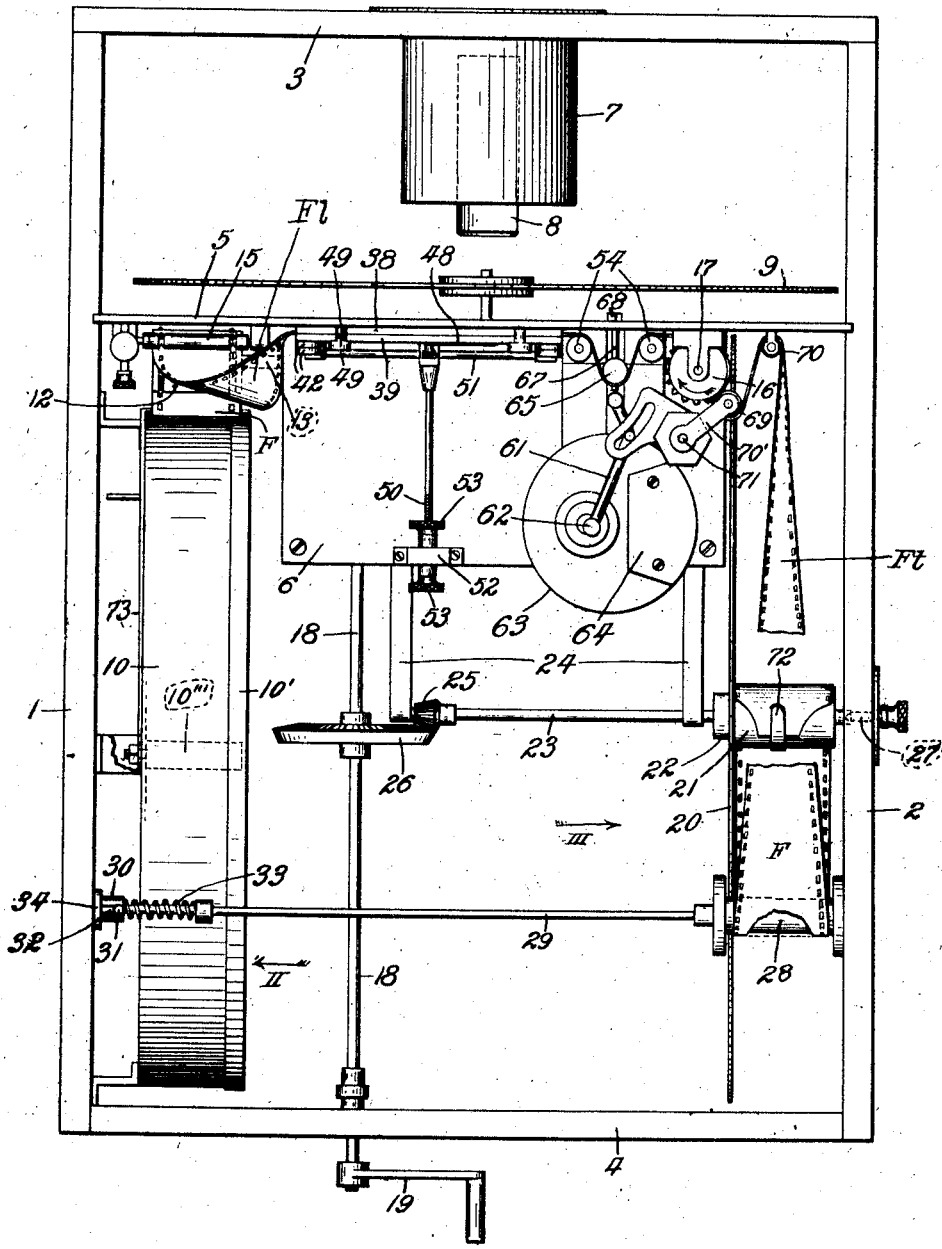
Fig. I.
WITNESSES:
E. A. Cahill
Myrtle M. Jackson
INVENTOR.
Geo. W. Curtiss.
BY
Arthur C. Brown
ATTORNEY.

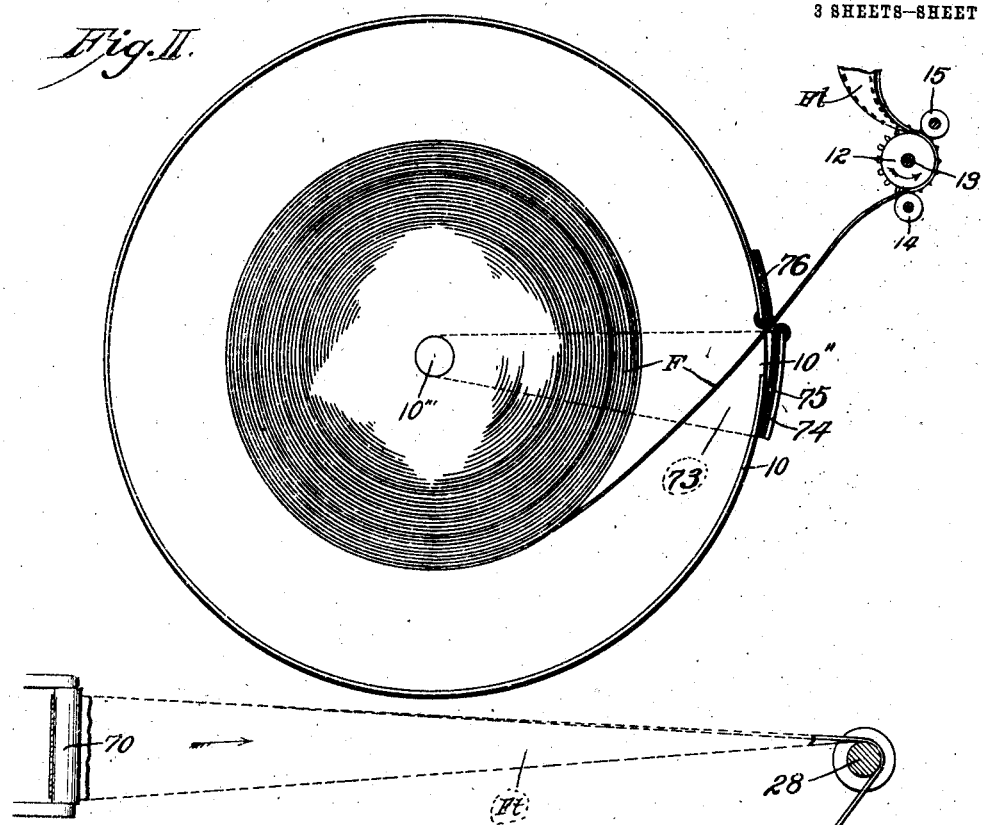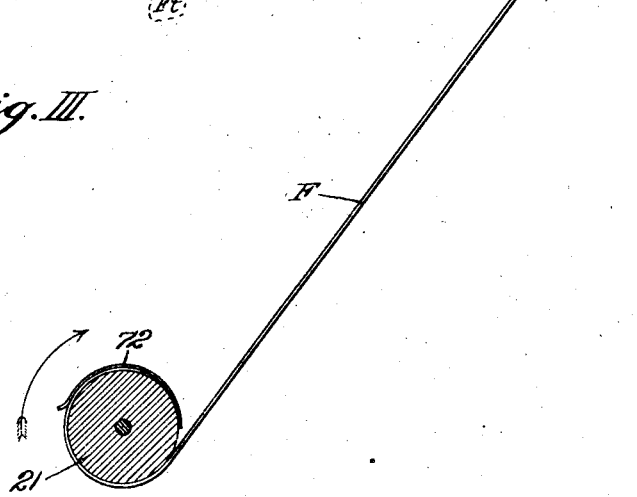

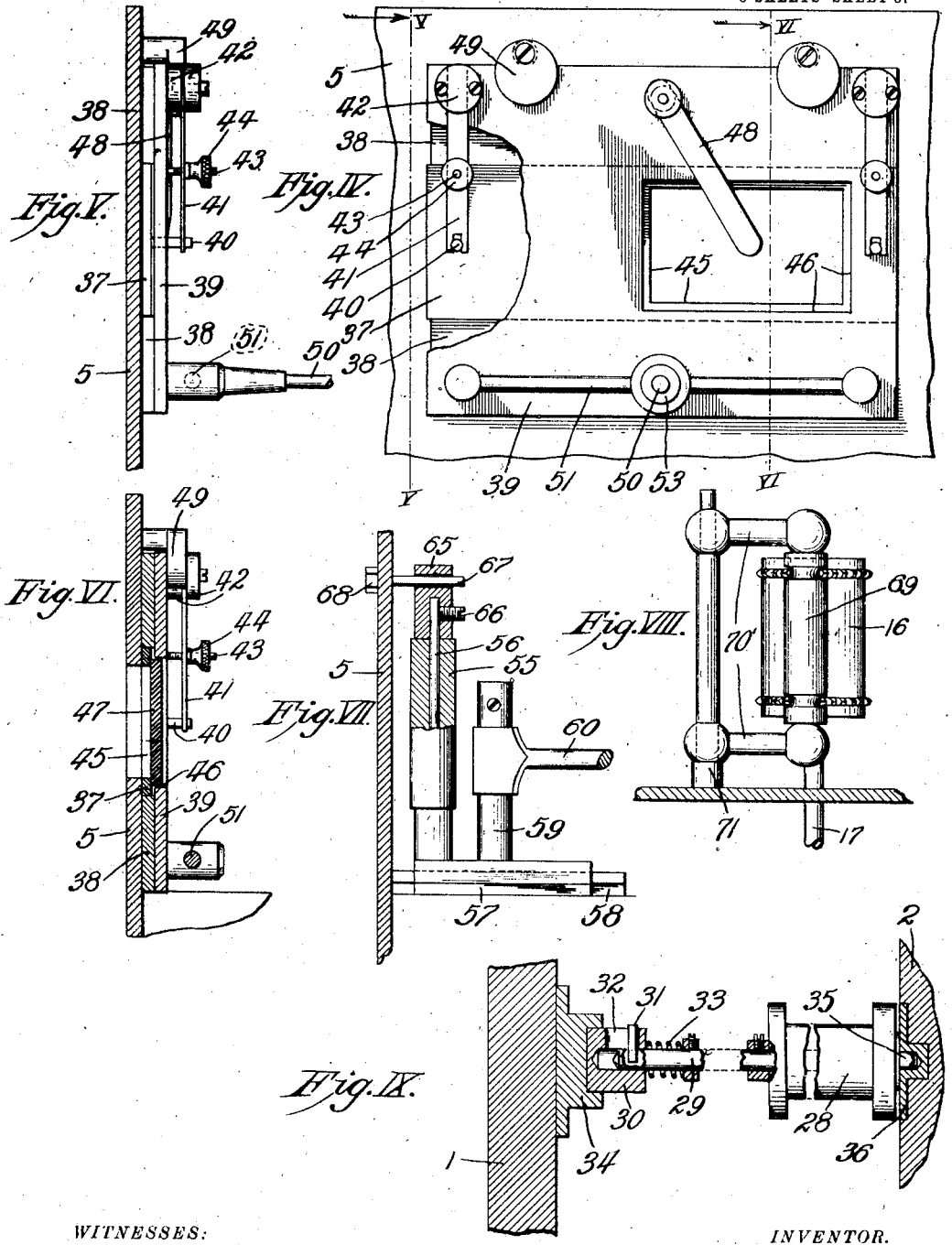

BEST AVAILABLE COPY

UNITED STATES PATENT OFFICE.

GEORGE W. CURTISS, OF KANSAS CITY, MISSOURI.

CAMERA.

1,044,028.  Specification of Letters Patent.  Patented Nov. 12, 1912.

Application filed May 24, 1909. Serial No. 497,992.

*To all whom it may concern:*

Be it known that I, GEORGE W. CURTISS, a citizen of the United States, residing at Kansas City, in the county of Jackson and State of Missouri, have invented certain new and useful Improvements in Cameras; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to chronophotographic cameras for taking pictures upon "moving picture films." The camera is of the intermittent feed type.

One object of the invention is to provide a mechanism that is compact and of small dimensions.

Another object is to eliminate vibration which is present in some machines of this kind when in operation.

Another object is to provide a very simple and reliable film tensioning device.

Another object is to provide means whereby the camera is convertible into a projecting kinetoscope by simply inserting a lamp and condenser.

Another object is to eliminate springs as much as possible in connection with the idle film rollers.

These objects are attained by the construction herein described and claimed, and illustrated in the accompanying drawings, in which:—

Figure I is a plan view of a mechanism embodying the invention, showing the film threaded therein from a magazine box onto the take-up reel. Fig. II is viewed in the direction of arrow II on Fig. I, and shows the film magazine, the first feed-sprocket, and the course of a film between the two. Fig. III is viewed in the direction of arrow III on Fig. I, and shows the course of a film from guide roller 70 onto the take up reel. Fig. IV is an inner side elevation of the tension carrier plate partly broken away and minus the detachable backing piece. Fig. V is a vertical sectional view taken on line V—V of Fig. IV. Fig. VI is a vertical section through the exposure opening, taken on line VI—VI of Fig. IV, but showing the backing piece in position. Fig. VII is a detail view of intermittent feed-roller and its guides. Fig. VIII is a detail view of the second feeding sprocket and its companion idle roller or film keeper. Fig. IX is a broken detail view showing the terminal portions of the film-guide holding rod 29.

Referring more in detail to the parts:—referring to Fig. I, the numerals 1 and 2 designate the sides of the light-proof case, 3 the front and 4 the back thereof. The top or cover is omitted. 5 designates an upright plate, on which are mounted the tension device, the intermittent film feed and a gear case or gear frame 6. 7 designates the objective lens mounting and 8 the lens. 9 is the revolving shutter which may be of any of the well known forms or of any preferred form, and has the usual function (that of excluding the light from the film except during the exposure intervals occurring during stationary phases of the film). 10 designates a receptacle for a roll of unexposed film (see also Fig. II). It is provided with a removable lid 10' and has a slot 10'' cut therein for egress of the film, F. 12 designates the first feed-sprocket, on a shaft 13, and provided with a keeper roller 14 (shown in Fig. II) and with a stripper roller 15, both said rollers having the usual functions, and the keeper roller being movable away from the sprocket, for convenience in "threading up". Sprocket 12 feeds the film to the tension device which will be presently described. 16 designates the second feed-sprocket, which is mounted on a vertical shaft 17 and is set close to the intermittent feed rollers. 18 designates the main, or drive shaft, which extends from the gear case or frame 6 rearwardly and through the wall 4, its end being formed to receive a detachable crank 19 by which the entire mechanism is driven. The main shaft 18 is geared to the feed-sprocket shafts 13 and 17 by any suitable gearing, and turns the sprockets continuously in the direction of the arrows and at the same speed if their diameters are equal. As the form of gearing to be employed is immaterial, and may be varied indefinitely, as is well known, its illustration is unnecessary. 20—21 designates the take-up reel, comprising the head 20 and the hub 21, detachably connected at 22 with a horizontal shaft 23, journaled in brackets 24. On shaft 23, is a bevel pinion 25, meshing with a bevel gear 26 on shaft 18. Either the gear 26 or the shaft 23 may be provided with a friction drive, for the well known purpose. The axis of reel 21 is rotatably supported by a screw stud 27, the retraction of which permits removal of the reel. 28 designates a guide, over which the film is passed as shown in Fig. III on its route to the take-up reel. This guide 28 may be mounted in any preferred manner, but must be removable to permit removal of the reel 20—21. As shown in the drawing it is mounted on a rod 29, the ends of which are constructed as seen in Fig. IX. A collar 30 is mounted slidably on one end of the rod 29 and is retained by a pin 31 projecting into a slot 32 therein. Collar 30 is pressed outwardly by a spring 33. A socket piece 34, adapted to receive the collar, is secured to the case 1. Projecting from the film guide part 28 is a short rounded stud 35, seated in a socket piece 36 in the opposite case wall. To remove the member 28, retract the collar 30 from socket 34, raise that end of the rod, and remove the stud 35 from its bearing.

For the tension device, see Figs. IV, V and VI. The front wall of the tension device is formed by the aforesaid vertical plate 5. The ribbon moves horizontally. 37 is the tension plate proper, shown in dotted outline in Fig. IV. Above and below it, secured to the frame-plate 5, are two spacing plates 38. The tension plate 37 is carried by a large rectangular plate 39, as follows: Each end of tension plate 37 is provided with a stud 40 that projects loosely through a hole in plate 39. Each stud 40 is engaged by a flat spring 41, clamped between disks 42 on plate 39. A screw stud 43 passes freely through each spring into plate 39, and bears a nut 44 for adjusting the pressure of the spring 41 upon its end of the tension plate. The latter has the exposure slot 45, registering with that of the frame-plate 5. I provide also in the tension carrier plate 39, an opening 46, somewhat larger than and registering with the opening 45. This larger opening is adapted to receive a backing-plate 47, of any opaque material, the same fitting loosely but being held in position by a spring 48 or any preferred means. Plate 47 should be used when the apparatus is worked as a camera. If it should ever be desired to use it as a projector, a source of light and a condenser can be supplied, and the plate 47 removed to permit the light to pass through film and thence through the objective in the usual way for projection. The tension carrier plate is of course detachable, and when in use, is held in position by turn-buttons 49, engaging its upper edge, and by a lower device consisting of a rearwardly extending screw 50 attached to a cross-rod 51, an upstanding lug 52 fixed on the horizontal plate 6, and two thumb-nuts 53. The hole through lug 52 is made sufficiently large to permit the screw 50 to be inserted at an angle from the normal. When the inner thumb-nut 53 is tightened up and the turn-buttons 49 dropped, the carrier plate 39 bears against plates 38; and the tension plate 37, being less thick than said plates 38, has space to yield to the film ribbon.

*The intermittent feed*, (Figs. I and VII.)—In its general construction this feed is like that disclosed in my allowed application for Letters Patent, Serial Number 404,399, filed November 29, 1907. It is therefore sufficient to state that it consists of two idle rollers 54, mounted on fixed posts or studs, a reciprocatory roller 55, and means for guiding and reciprocating the latter, whose line of motion is at right angles to that of the film. The post 56 bearing this roller is rigidly held by a slide 57, held between guides 58. A stud 59 on the slide 57 is connected by link 60 to a pitman 61, connected to a wrist-pin 62 eccentrically mounted on a wheel 63. This wheel is continuously rotated by suitable gearing from the drive shaft 18. In the present improvements I provide the wheel 63 with a counterweight 64, which is so disposed as to balance the wrist-pin and pitman and counteract the tendency to vibrate the mechanism when running.

Another feature of the present improvements consists in providing an auxiliary guide for the roller 55 (see Fig. VII). The stud or post 56 is projected above the top of the roller 55, and has tightly fitted thereon a collar 65 provided with a set-screw 66. A hole is drilled transversely through this collar above the post 56. A guide-pin 67 is rigidly secured to the frame plate 5 and projects through said transverse hole, forming an upper guide which prevents any lateral motion of the roller 55 to right or left.

68 is a nut by which the pin 67 may be secured to plate 5.

Still another feature of the present improvements consists in the peculiar arrangement of the two idle rollers 69 and 70 relatively to the second feed-sprocket 16. Roller 69, which retains the film in engagement with the teeth of the sprocket, is so mounted that the tension on the film draws and holds said roller in position. Thus I dispense with the usual troublesome spring or springs. The roller spindles are carried by arms 70′, mounted rotatably on a standard 71, and no spring is necessary. The requisite pressure upon the roller 69 is obtained through the position of the roller 70, as will be clearly understood by reference to Fig. I.

Another feature of the present improvements is the mechanism for closing the film case 10 against the entrance of light. At one side of the slot 10″ is attached a strip of velvet or like material 76. Pivoted on the axle 10‴ (upon which the case is mounted) is an arm 73, having a flange 74 extending laterally over the periphery of the case to cover the slot 10″. The inner face of flange 74 is also covered with velvet or like material 75 that contacts with the strip 76. The friction of the arm on its axle and of the velvet coverings 76—75 will hold the bracket in place when moved over the slot. It is readily apparent that the slot may be covered by the bracket flange while the case is not in use and may be uncovered by turning the bracket when the film is to be run.

The film is threaded through the machine as follows:—The roll is placed in box 10 and its "leader" passed through the slot 10″ and beneath the first feed sprocket 12, and behind the stripper roller 15. The tension carrier plate 39 is removed, and the film is passed behind the first roller 54, in front of the reciprocative roller 55, behind the second roller 54, between sprocket 16 and its roller 69, behind roller 70, back to and over the guide 28, and down to the reel hub 21, to which it is attached by the clip 72. The reel is turned until the slack is taken out of the film between it and the sprocket 16. The film crossing the exposure opening is laid flat against plate 5, and the tension carrier 39 placed in position, it being secured as previously explained. There will now be a twisted film loop F¹ between the tension and the idler 15. This loop should be adjusted to a proper size, neither too long nor too short, by adjusting the film upon the sprocket 12; after which the retaining roller 14 is engaged with the film by springs or in any preferred manner. The cap being removed from the objective, the machine is now ready for operation, which is as follows:—The operator turns the crank in the right direction; this continuously rotates the feeding sprockets 12, 16, the shutter 9, the pitman wheel 63, and the reel 20—21. Sprocket 12 draws film from the box 10 and feeds it to the tension parts. The reciprocating roller 55 alternately draws out a length of film equal to the length of the exposure opening, and slackens the film. In other words, the roller 55 draws film intermittently across the exposure opening, and does so with unvarying accuracy as to the distance the film is shifted. The reel 20—21 takes up the film and maintains a tension upon the film at $Ft$, thereby holding the roller 69 in position. This mechanism operates without vibration, owing to this fact the definition of the photographic images will be sharp and clear.

It will be noted that the pictures will abut end to end on the film instead of top to bottom as in common films.

Having thus described my invention, what I claim as new therein and desire to secure by Letters-Patent is:—

1. Intermittent web feeding mechanism comprising a web shifting roller mounted on an extended axis, a reciprocatory part to which one end of said axis is rigidly secured, guides for said part, and a parallel guide for the extended end of said axis.

2. Intermittent web feeding mechanism comprising a web shifting roller mounted on a vertical axis, a reciprocatory support for said axis, guides for said support, a member secured to said axis above the roller, and a stationary guide pin passing slidably through an opening in said member parallel to the line of motion of said roller.

3. In a chronophotographic machine, a film-feed sprocket, a retaining roller mounted on swing arms and adapted to contact said sprocket, a roller substantially in line with said retaining roller and its arm pivots, and a take-up reel and means for rotating the same; whereby said retaining roller is held in position by film tension.

4. In a chronophotographic machine, a post, arms pivoted thereon, a roller carried by said arms, a film-feed sprocket located to be contacted by said roller, an idle film-guide roller located opposite from said post with respect to the first roller, a take-up reel and means for rotating the same; whereby said first roller is held in position by film tension.

In testimony whereof I affix my signature in presence of two witnesses.

GEORGE W. CURTISS.

Witnesses:
MYRTLE M. JACKSON,
E. A. CAHILL.